United States Patent
Demchalk et al.

(10) Patent No.: US 12,243,337 B2
(45) Date of Patent: Mar. 4, 2025

(54) TEXT EXTRACTION USING OPTICAL CHARACTER RECOGNITION

(71) Applicant: Capital One Services, LLC, McLean, VA (US)

(72) Inventors: Chris Demchalk, Frisco, TX (US); Ryan M. Parker, Dallas, TX (US); Lokesh Vijay Kumar, Frisco, TX (US); Brian Fromknecht, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/599,667

(22) Filed: Mar. 8, 2024

(65) Prior Publication Data

US 2024/0212375 A1  Jun. 27, 2024

Related U.S. Application Data

(63) Continuation of application No. 17/741,113, filed on May 10, 2022, now Pat. No. 11,961,316.

(51) Int. Cl.
*G06V 30/12* (2022.01)
*G06V 30/148* (2022.01)
*G06V 30/26* (2022.01)
*G06V 30/41* (2022.01)

(52) U.S. Cl.
CPC .......... *G06V 30/133* (2022.01); *G06V 30/155* (2022.01); *G06V 30/26* (2022.01); *G06V 30/41* (2022.01)

(58) Field of Classification Search
CPC ................................................ G06V 30/00–43
See application file for complete search history.

(56) References Cited

U.S. PATENT DOCUMENTS

| | | | | |
|---|---|---|---|---|
| 6,738,519 | B1 * | 5/2004 | Nishiwaki | G06V 30/268 |
| | | | | 382/218 |
| 7,734,092 | B2 * | 6/2010 | Curtis | G06F 18/254 |
| | | | | 382/176 |
| 9,141,607 | B1 * | 9/2015 | Lee | G06F 40/58 |
| 10,467,717 | B2 | 11/2019 | Cai et al. | |
| 10,509,813 | B1 | 12/2019 | Pemmaraju et al. | |
| 10,740,638 | B1 * | 8/2020 | Annis | G06V 30/412 |
| 10,789,103 | B1 | 9/2020 | Karanam et al. | |
| 10,867,268 | B1 | 12/2020 | Kumar et al. | |
| 10,917,483 | B2 | 2/2021 | Hodges et al. | |
| 12,100,234 | B1 * | 9/2024 | Catlin | G06V 30/414 |
| 2002/0051575 | A1 * | 5/2002 | Myers | G06V 20/63 |
| | | | | 382/202 |
| 2002/0061135 | A1 * | 5/2002 | Naoi | G06V 30/414 |
| | | | | 382/190 |

(Continued)

*Primary Examiner* — Sean T Motsinger

(74) *Attorney, Agent, or Firm* — Sterne, Kessler, Goldstein & Fox P.L.L.C.

(57) ABSTRACT

Provided herein are systems and methods for extracting text from a document. Different optical character recognition (OCR) tools are used to extract different versions of the text in the document. Metrics evaluating the quality of the extracted text are compared to identify and select higher quality extracted text. A selected portion of text is compared to a threshold to ensure minimal quality. The selected (Continued)

portion of text is then saved. Error correction can be applied to the selected portion of text based on errors specific to the OCR tools or the document contents.

17 Claims, 4 Drawing Sheets

(56) References Cited

U.S. PATENT DOCUMENTS

| | | | | |
|---|---|---|---|---|
| 2002/0126905 A1* | 9/2002 | Suzuki | G06V 30/2455 | 382/229 |
| 2005/0180632 A1* | 8/2005 | Aradhye | G06V 20/63 | 382/182 |
| 2006/0059162 A1* | 3/2006 | Rizk | G06F 40/10 | 707/999.009 |
| 2007/0211942 A1* | 9/2007 | Curtis | G06F 18/254 | 382/181 |
| 2008/0063276 A1* | 3/2008 | Vincent | G06V 10/809 | 382/182 |
| 2008/0310721 A1* | 12/2008 | Yang | G06V 30/182 | 382/182 |
| 2012/0134589 A1* | 5/2012 | Reddy | G06F 18/254 | 382/182 |
| 2013/0315441 A1* | 11/2013 | Blose | G06V 30/262 | 382/103 |
| 2014/0040715 A1* | 2/2014 | Younge | G06F 40/166 | 715/203 |
| 2014/0355896 A1* | 12/2014 | Osada | G06V 30/155 | 382/229 |
| 2015/0006387 A1* | 1/2015 | Wang | G06V 10/10 | 705/44 |
| 2015/0009542 A1* | 1/2015 | Zhao | H04N 1/00331 | 358/462 |
| 2015/0379343 A1* | 12/2015 | Powell | G06F 18/251 | 382/229 |
| 2017/0116494 A1* | 4/2017 | Isaev | G06V 20/46 | |
| 2017/0124413 A1* | 5/2017 | Deng | G06V 30/153 | |
| 2018/0189592 A1* | 7/2018 | Annis | G06V 30/153 | |
| 2019/0102649 A1* | 4/2019 | Ackley | G06V 10/809 | |
| 2020/0160080 A1* | 5/2020 | Golding | G06T 5/30 | |
| 2020/0334546 A1* | 10/2020 | Muschett | G06N 5/025 | |
| 2021/0124991 A1* | 4/2021 | Kimura | G06V 10/75 | |
| 2023/0132720 A1* | 5/2023 | Khmaissia | G06V 30/19013 | 382/181 |
| 2023/0326459 A1* | 10/2023 | Tsutsui | G10L 15/26 | |
| 2023/0368550 A1* | 11/2023 | Demchalk | G06V 30/26 | |

\* cited by examiner

TEXT EXTRACTION USING OPTICAL CHARACTER RECOGNITION

CROSS-REFERENCE TO RELATED APPLICATIONS

This application is a continuation of U.S. application Ser. No. 17/741,113, entitled "Text Extraction Using Optical Character Recognition", filed May 10, 2022, which is herein incorporated by reference in its entirety.

BACKGROUND

Document review is often performed by hand, with a person reading a document and evaluating the content. In many cases, due to the expertise needed to properly review the document and the large number of documents, the cost of such a venture is prohibitive. As more and more documents become available in digital format, it has become common to turn to computer-aided document review. Many documents in digital format are not in a searchable format. Various techniques are used to rectify this problem, one of the more common ones being optical character recognition (OCR). OCR services and tools are available in websites or software, including as plugins or tools within software for viewing the documents, such as software for viewing documents in portable document format (PDF). However, OCR tools do not always extract the text properly. In some cases, digital artifacts are left behind. In other cases, the OCR tool fails to extract portions of the text. Additionally, certain types of text, such as mathematical equations or images, can result in nonsensical extracted text. These various issues result from a variety of sources, including the original format of the document and the algorithm or implementation of the OCR tool.

BRIEF SUMMARY

Disclosed herein are systems, methods and computer program products for extracting text from a document using OCR tools.

In an embodiment, methods or systems extract sets of text from a document using OCR tools. Each set of text is extracted using a different OCR tool. The sets of text are compared based on a first metric in each of the plurality of sets of text. The first metric measures a document-level OCR quality of the set of text. A text is selected from the sets of text based on the first metric. The selected text is stored in a searchable format in response to the selected text having a second metric greater than a threshold. The second metric measures page-level OCR quality of the extracted text.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
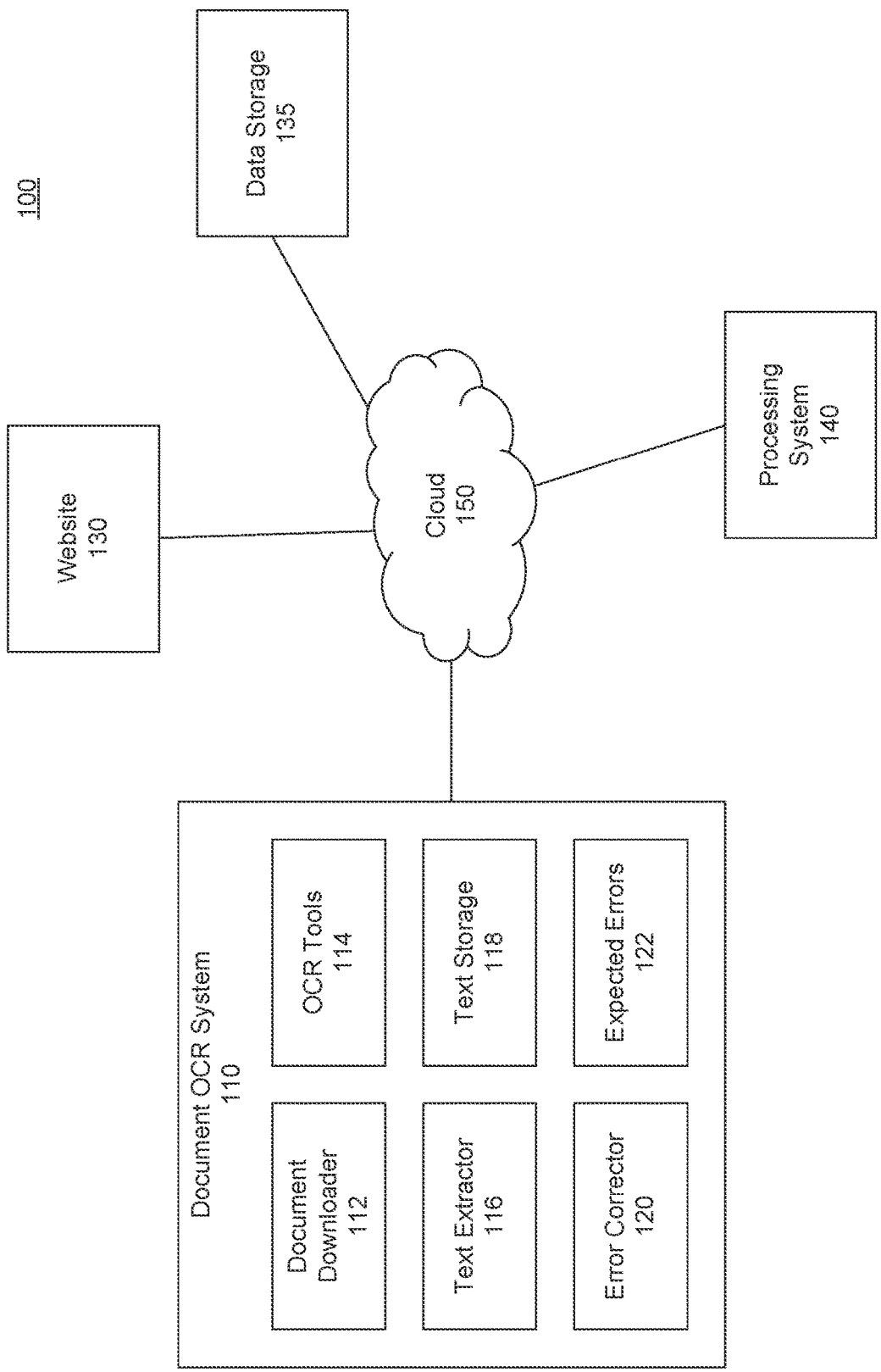
FIG. 1 illustrates a block diagram of a text extraction system, according to some embodiments.

Provided herein are system, method and/or computer program product embodiments, and/or combinations and sub-combinations thereof, for extracting text from a document using OCR tools.

Computer processing and analysis of documents, via such techniques as natural language processing and machine learning, can speed up and replace manual document review in many instances. However, many digital documents are not in a format that can be directly accessed by machine learning algorithms or natural language processing tools. A variety of tools are available to extract text from these documents and make it machine-readable or accessible for the algorithms. OCR is used in many situations to extract machine-readable text from documents.

Various forms of OCR are used in a variety of settings to extract text from documents to accomplish this goal. Different OCR tools are available to perform the OCR of the documents, with each OCR tool using its own algorithm or approach to performing OCR. Different OCR tools run faster or slower, provide higher or lower quality text extraction, are customized for specific applications, or vary in other ways. Even with all these tools, it is still common to find errors in text extraction. In some cases, small errors can occur, such as individual characters being read as a different character, such as the letter "S" being mistaken for the number "5." In some cases, portions of the text can be lost, such as due to unexpected characters in equations.

OCR tools that are customized for specific types of documents or specific content of those documents may reduce errors. However, when processing large sets of documents, variation in the documents can result in no single OCR tool being optimal for the set. For example, some documents only contain non-machine readable text, others contain images, and still others contain a mixture of the two. As a result, it can be difficult to identify the "best" OCR tool for a given set of documents.

Determining the quality of an OCR tool can also be complicated by the variation in documents. For example, some documents contain large amounts of text that certain OCR tools cannot accurately identify, resulting in an extracted text with low word count. Other documents contain many images, reducing the amount of text available for extraction at all. Still other documents have headers or footers, which reduce the amount of text that is present on a page. As a result, evaluating the quality of a given OCR tool can be difficult, as the different documents produce different resulting metrics.

Embodiments of the methods and systems disclosed herein provide solutions to some or all of these different problems by extracting text from the same document using different OCR tools and comparing the extracted text to identify the best extracted text from the different tools, based on certain metrics or characteristics of the extracted text. In some embodiments, the extracted text documents are added to a storage repository for processing or are flagged as undesired or problematic documents for exclusion processing or manual review. In some embodiments, the text extraction further includes error correction tailored for known OCR errors that are not typically fixed by spell-checker software, improving the quality of the extracted text.

FIG. 1 illustrates a block diagram of a text extraction system 100, according to some embodiments. Text extraction system 100 has a document OCR system 110, a website 130, data storage 135, and a processing system 140 connected together via cloud 150. Cloud 150 is a network or cloud system that provides a connection between various computer and storage systems, such as computer systems 400, described below in FIG. 4. In some embodiments, document OCR system 110, website 130, data storage 135, and processing system 140 are provided by or as part of one or more computers or servers, such as computer system 400, described below in FIG. 4.

Document OCR system 110 is a system for performing OCR on documents. Document OCR system 110 can process single documents or sets of documents. A set of documents can be downloaded or provided to document OCR system 110 via document downloader 112. In some embodiments, the documents are downloaded or accessed by document downloader 112 from website 130 or data storage 135. In some embodiments, document downloader 112 scrapes the documents from website 130. In some embodiments, document downloader 112 downloads or otherwise accesses documents from data storage 135. The documents can be in various formats, such as portable document format (PDF), scanned images of text, or other formats that are not necessarily stored in a machine-readable format.

In some embodiments, document downloader 112 checks to determine if a set of downloaded documents contains duplicates. In some embodiments, the check is performed as documents are downloaded and duplicate documents are skipped and not downloaded.

In some embodiments, website 130 represents one or more websites containing documents. In some embodiments, website 130 is a repository for documents. As a non-limiting example, website 130 can be a government agency website that stores and allows access to digital copies of regulatory actions, complaints, or comments on those actions or complaints.

Data storage 135 is a server, computer, hard drive, or other non-transitory storage system designed to store data, such as some or all of a set of documents to be processed by document OCR system 110. In some embodiments, documents in data storage 135 were previously scraped, downloaded, or otherwise extracted from website 130 or another source.

Document OCR system 110 has OCR tools 114. Each OCR tool in OCR tools 114 is a different OCR tool configured to use a different algorithm or technique to perform OCR on documents. In some embodiments, the differences in OCR tools 114 include that the OCR tools are for specific types of documents, specific speed of performing OCR, or variations of similar OCR algorithms. In some embodiments, at least one OCR tool in OCR tools 114 converts a document from the set of documents into a set of images, each image of a page of the document. The OCR tool is configured to extract a set of text from the images. As non-limiting examples, OCR tools 114 can include pdfminer, ocrmypdf, and pypdf2.

Document OCR system 110 performs text extraction from the documents using text extractor 116. Text extractor 116 accesses OCR tools 114 to utilize specific OCR tools as part of the text extraction. In some embodiments, text extractor 116 performs text extraction using more than one OCR tool from OCR tools 114.

In some embodiments, text extractor 116 checks properties or metrics of the extracted text. In some embodiments, the properties or metrics provide a comparison of performance between different OCR tools. In some embodiments, the properties or metrics are used to check the quality of the OCR performed individually by each OCR tool, such as by comparison to a threshold. In some embodiments, text extractor determines the number of words extracted in total from a document. In some embodiments, text extractor determines the number of words per page in the text extracted from the document.

In some embodiments, text extractor 116 passes or fails the extracted text from a document based on the properties or statistical measures as compared to one or more thresholds. For example, if the extracted text is not greater than a minimum number of words per page, the extracted text fails extraction. In some embodiments, text extractor 116 flags text that fails extraction for manual review.

In some embodiments, text extractor 116 adjusts the threshold for passing or failing extracted text based on a source of the document. For example, the threshold for number of words per page is adjusted based on an expected number of words per page for documents from a specific source. As a specific, non-limiting example, a government agency website may be a source of documents that are primarily text and have a high number of words per page. The threshold is then set higher due to the expectation that there is a lot of text on each page. As another non-limiting example, a business website may be a source of both specifications for products sold by the business and advertisements for those products. The advertisements may be primarily images, reducing the amount of text per page. The threshold is then set to differentiate between the advertisements, which are not desired for text extraction, and the specifications, which are.

The text or sets of text extracted by text extractor 116 are stored in text storage 118. Text storage 118 is data storage for text of documents. In some embodiments, text storage 118 stores the original document and a machine-readable format that can be overlaid on the original text. In some embodiments, the machine-readable format is a string of characters containing the text of the document. In some embodiments, the text is stored in a markup language or standard file format, such as JavaScript Object Notation (JSON) or similar standard data structures or file formats.

Those skilled in the art will appreciate that OCR can leave textual artifacts in the extracted text. For example, similarly shaped letters, such as U and V can be mistaken for one another. Numbers are also sometimes mistaken for letters, and vice versa. In other cases, symbols can be mistaken for letters or numbers as well. As specific, non-limiting examples, an "S," a "5," and a "$" are all similar characters that can be mistaken for each other by OCR tools. In some embodiments, certain letters and numbers are confused depending on capitalization. For example, the number "1," the letter lowercase L, "l," and the letter capital "I" can be confused. In some embodiments, spaces are added or deleted between letters. In some embodiments, punctuation characters are added or deleted, or text is reformatted, such as subscripts and superscripts before and after text.

While spell-checking software is able to correct some errors in OCR, many of these errors are not the kind that are easy to detect. Manually reviewing the text to correct the errors can, in some cases, defeat the gains made by using OCR in the first place. In some embodiments, error corrector 120 corrects one or more expected errors in the text stored in text storage 118. A listing of the expected errors is stored in expected errors 122.

In some embodiments, expected errors 122 are expected based on known performance issues with a given OCR tool. In some embodiments, expected errors 122 are expected based on common errors on the expected content of the documents. For example, a document containing specifically formatted text, such as citations to other documents, is not easily corrected using typical error correction techniques. However, such citations generate certain known or expected types of errors when the text is extracted using OCR. As a result, error corrector 120 is able to seek out these portions of the text and either correct them or flag them for manual review. For example, regular expressions are used to identify possible text errors based on either specific characters that are commonly in an error or surrounding text that is close to a specific expected string, such as a citation, but which contains minor differences. In some embodiments, error corrector 120 makes the corrections to the text stored in text storage 118.

In some embodiments, document OCR system 110 provides the final text to processing system 140 for further processing. Processing system 140 is any system for processing the text or sets of text extracted from a document or set of documents. As a non-limiting example, processing system 140 is a natural language processing system used to classify documents based on some or all of their content. As another non-limiting example, processing system 140 is a system for extracting citations or document references from the text in a document and comparing it to some other reference. In some embodiments, processing system 140 relies on document OCR system 110 to extract the text from the documents and put it in a format that allows processing system 140 to process or otherwise make use of the text.

Figure 2:
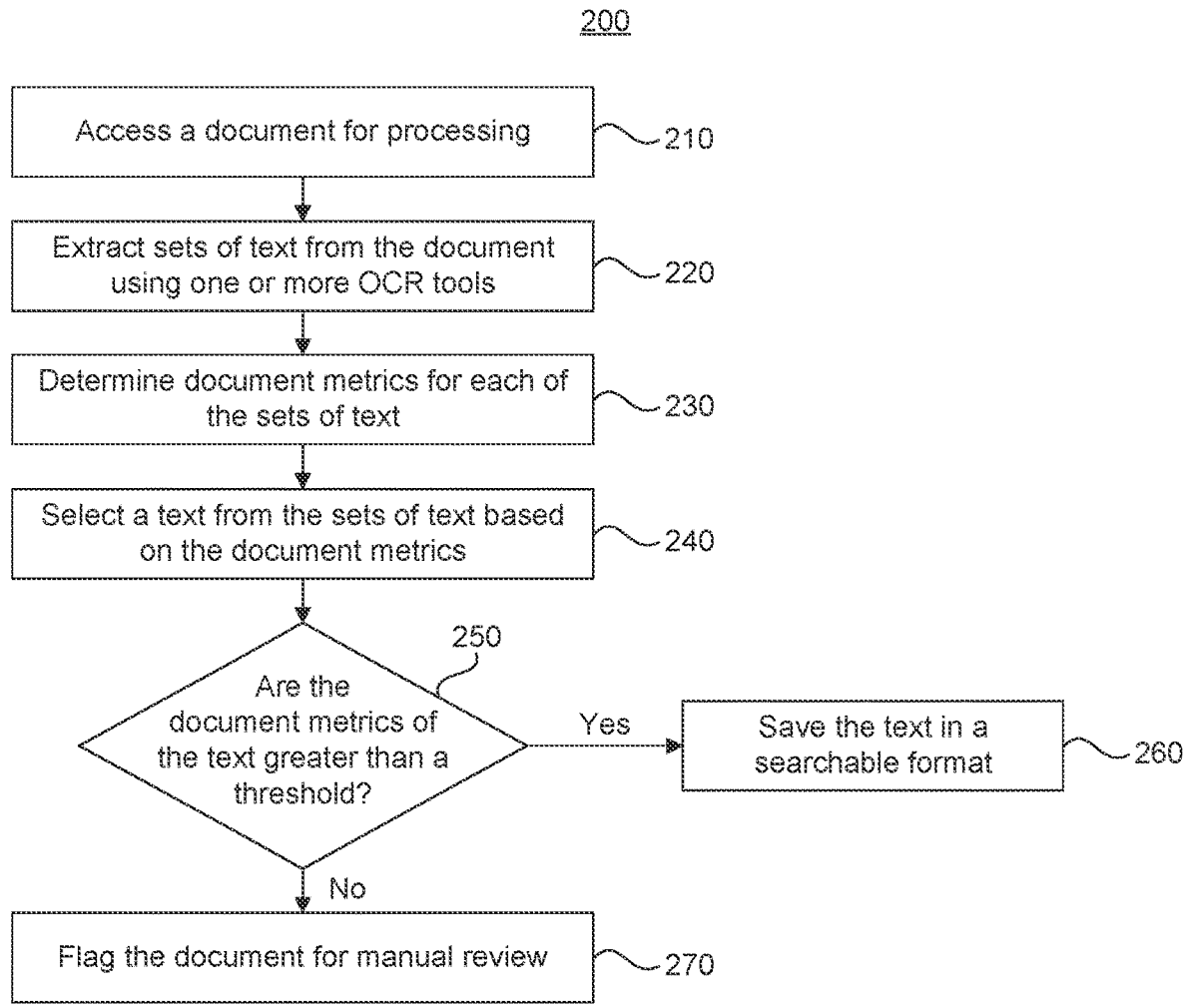
FIG. 2 is a flowchart illustrating a method for extracting text from a document, according to some embodiments.

FIG. 2 is a flowchart illustrating a method 200 for extracting text from a document, according to some embodiments.

In 210, document downloader 112 accesses a document for processing. In some embodiments, accessing the document involves scraping or downloading the document from website 130. In some embodiments, accessing the document involves downloading or opening the document from data storage 135.

In some embodiments, the document is in a format with at least some of the document unable to be read by a computer system or algorithm, such as processing system 140. In some embodiments, the document is in PDF format. In some embodiments, at least some pages of the document are images, such as scanned images of text or non-digital documents, images of text in digital documents, or digital image file containing both text and images. For example, the document can be a word processing file saved in PDF format, such as a regulatory action, scanned images of a physical copy of a book, a digital flier or advertisement, a research paper, or a digital image of comments on a topic from an online forum.

In 220, text extractor 116 extracts sets of text from the document using one or more OCR tools 114. Each set of text is extracted using a different OCR tool from OCR tools 114. In some embodiments, each OCR tool is selected based on using a different type of text extraction algorithm. For example, in some embodiments, an OCR tool extracts text by analyzing the contents of images in the document, such as PDF images. As another example, a different OCR tool extracts text by capturing images of each page of the document and then extracting the text from those images. In some embodiments, this allows the different OCR tool to process multiple images on a page of a document as a single image, rather than processing them separately. Those skilled in the art will appreciate that each OCR tool may differ in how it extracts the text, such as using completely different approaches or algorithms, or by varying parameters in similar or otherwise identical approaches or algorithms.

In some embodiments, two or more different OCR tools 114 are used by text extractor 116 to extract the text from the document. In some embodiments, the two or more different OCR tools are selected based on expected formats or contents of the documents from which text is being extracted. For example, if the documents are all PDF format, one of the OCR tools selected from OCR tools 114 may be an OCR tool specifically configured to extract text from PDFs. As another example, if the documents are regulatory documents that contain citations, one of the OCR tools selected from OCR tools 114 may be an OCR tool specifically configured to extract citations correctly or with improved accuracy.

In some embodiments, the different OCR tools are selected based on only a portion of the document contents. For example, the documents contain both text and images, including images that contain writing, and the OCR tool selected from OCR tools 114 is selected based on the images and is configured to extract writing from images with improved accuracy. As another example, a document contains several different sections with different types of content or differently formatted text, one section of which is of specific interest. The OCR tool selected from OCR tools 114 is selected based on the content of only one of these sections and is configured to more accurately extract text from documents formatted like that section or with the content of that section, even though the OCR tool extracts text with lower accuracy for text formatted according to some of the other sections of the document.

In 230, text extractor 116 determines document metrics for each of the sets of text. In some embodiments, the document metrics are metrics for measuring the quality of the text extracted by a given OCR tool. In some embodiments, a document metric measures a document-level OCR quality. For example, the document metric can be a total number of words in the set of text extracted by the OCR tool from the document. In some embodiments, a document metric measures a page-level OCR quality. For example, the document metric can be a number of words in the set of text extracted from the document divided by a number of pages in the document.

In 240, text extractor 116 selects a portion of text from the sets of text based on the document metrics. In some embodiments, the text selected is the set of text with the document metric that indicates the highest level of quality in the extracted text. For example, the document metric is a number of words in the extracted text. When the number of words in a first set of text is higher than the number of words in a second set of text, in some embodiments, this indicates that the first set of text has a higher quality than the second set of text, at least for the specific document.

In some embodiments, text extractor 116 selects the text based on only some of the document metrics. For example, if the document metrics are the number of words in the set of text and the number of words per page for each set of text, the number of words in the set of text is used by text extractor 116 to select the text, while the number of words per page is not.

In 250, if the document metrics of the text are greater than a threshold, method 200 proceeds to operation 260. If the document metrics of the text are not greater than the threshold, method 200 proceeds to operation 270. In some embodiments, this ensures that the selected text extracted from the document is of good quality by verifying that the document metrics are greater than the threshold. For example, the selected text can have a low number of words, but still have more words than other sets of text extracted from the document. However, if the number is below some threshold, this may indicate that none of the OCR tools were able to extract the text from the document in a meaningful way. The low number of words can also indicate that the document does not contain many words, such as in documents consisting primarily of images. In either case, checking the document metrics against the threshold ensures that the text extracted from the document either is of an expected quality and is sent to operation 260, or is suspect and needs to be manually checked at operation 270.

In some embodiments, operation 250 compares the same document metrics used to select the text in operation 240. In some embodiments, a different document metric is used to check against the threshold. For example, after selecting the text based on the number of words in the sets of text extracted from the document, the number of words per page can be compared to the threshold. In some embodiments, using the number of words per page is a better measure of how well OCR tools 114 extracted the selected text from the document.

In 260, text extractor 116 saves the text in a searchable format. In some embodiments, the text is saved in text storage 118. In some embodiments, the text is saved in PDF format. In some embodiments, the text is saved in a single document that places the selected text over the corresponding portions of the document in a machine-readable or searchable format. In some embodiments, the text is saved as a machine-readable or searchable file format separate from the original document. For example, the selected text can be stored as a JSON file.

In 270, text extractor 116 flags the document for manual review. In some embodiments, the document is sent to a computer system, such as computer system 400, or to other document storage. In some embodiments, the extracted sets of text or the selected text are sent with the document. In some embodiments, after manual review, if the selected text or one of the sets of text is determined to be an accurate representation of the document, the document and the selected text are processed according to operation 260. In some embodiments, operation 270 discards the document.

Figure 3:
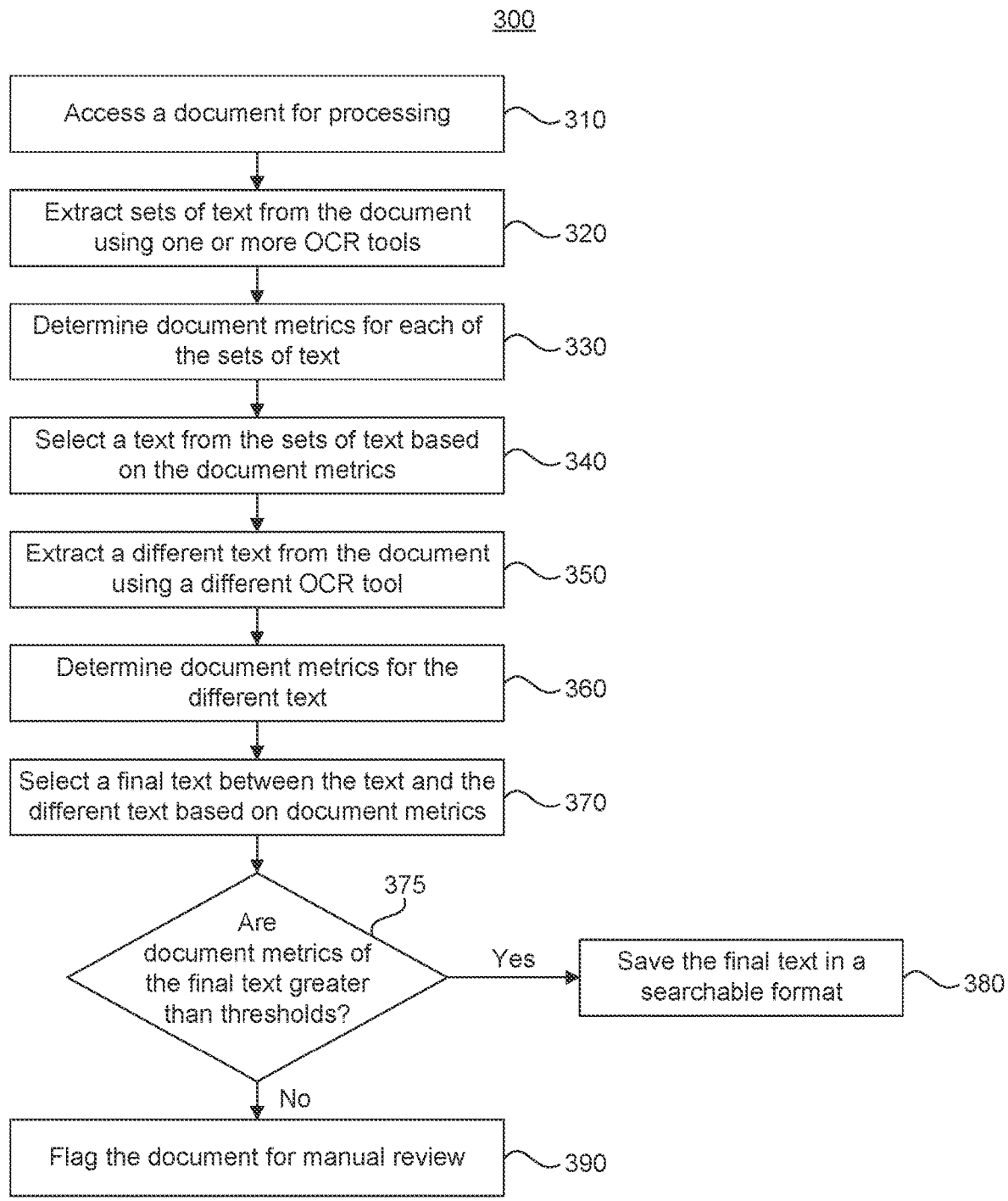
FIG. 3 is a flowchart illustrating a method for extracting text from a document, according to some embodiments.

FIG. 3 is a flowchart illustrating a method 300 for extracting text from a document, according to some embodiments.

In 310, document downloader 112 accesses a document for processing. In some embodiments, accessing the document involves scraping or downloading the document from website 130. In some embodiments, accessing the document involves downloading or opening the document from data storage 135.

In some embodiments, the document is in a format with at least some of the document unable to be read by a computer system or algorithm, such as processing system 140. In some embodiments, the document is in PDF format. In some embodiments, at least some pages of the document are images, such as scanned images of text or non-digital documents, images of text in digital documents, or digital image file containing both text and images. For example, the document can be a word processing file saved in PDF format, such as a regulatory action, scanned images of a physical copy of a book, a digital flier or advertisement, a research paper, or a digital image of comments on a topic from an online forum.

In 320, text extractor 116 extracts sets of text from the document using one or more OCR tools 114. Each set of text is extracted using a different OCR tool from OCR tools 114. In some embodiments, each OCR tool is selected based on using a different type of text extraction algorithm. For example, in some embodiments, an OCR tool extracts text by analyzing the contents of images in the document, such as PDF images. As another example, a different OCR tool extracts text by capturing images of each page of the document and then extracting the text from those images. In some embodiments, this allows the different OCR tool to process multiple images on a page of a document as a single image, rather than processing them separately. Those skilled in the art will appreciate that each OCR tool may differ in how it extracts the text, such as using completely different approaches or algorithms, or by varying parameters in similar or otherwise identical approaches or algorithms.

In some embodiments, two or more different OCR tools 114 are used by text extractor 116 to extract the text from the document. In some embodiments, the two or more different OCR tools are selected based on expected formats or contents of the documents from which text is being extracted. For example, if the documents are all PDF format, one of the OCR tools selected from OCR tools 114 may be an OCR tool specifically configured to extract text from PDFs. As another example, if the documents are regulatory documents that contain citations, one of the OCR tools selected from OCR tools 114 may be an OCR tool specifically configured to extract citations correctly or with improved accuracy.

In some embodiments, the different OCR tools are selected based on only a portion of the document contents. For example, the documents contain both text and images, including images that contain writing, and the OCR tool selected from OCR tools 114 is selected based on the images and is configured to extract writing from images with improved accuracy. As another example, a document contains several different sections with different types of content or differently formatted text, one section of which is of specific interest. The OCR tool selected from OCR tools 114 is selected based on the content of only one of these sections and is configured to more accurately extract text from documents formatted like that section or with the content of that section, even though the OCR tool extracts text with lower accuracy for text formatted according to some of the other sections of the document.

In 330, text extractor 116 determines document metrics for each of the sets of text. In some embodiments, the document metrics are metrics for measuring the quality of the text extracted by a given OCR tool. In some embodiments, a document metric measures a document-level OCR quality. For example, the document metric can be a total number of words in the set of text extracted by the OCR tool from the document. In some embodiments, a document metric measures a page-level OCR quality. For example, the document metric can be a number of words in the set of text extracted from the document divided by a number of pages in the document.

In 340, text extractor 116 selects a text from the sets of text based on the document metrics. In some embodiments, the text selected is the set of text with the document metric that indicates the highest level of quality in the extracted text. For example, the document metric is a number of words in the extracted text. When the number of words in a first set of text is higher than the number of words in a second set of text, in some embodiments, this indicates that the first set of text has a higher quality than the second set of text, at least for the specific document.

In some embodiments, text extractor 116 selects the text based on only some of the document metrics. For example, if the document metrics are the number of words in the set of text and the number of words per page for each set of text, the number of words in the set of text is used by text extractor 116 to select the text, while the number of words per page is not.

In 350, text extractor 116 extracts a different text from the document using a different OCR tool from OCR tools 114. The different text is extracted using a different OCR tool from the one or more OCR tools used in operation 320. In some embodiments, the different OCR tool is selected to perform a verification step. For example, the different OCR tool may be a variation of an OCR tool used in operation 320 to compare performance or an OCR tool that is preferred.

In 360, text extractor 116 determines document metrics for the different text. In some embodiments, the document metrics are metrics for measuring the quality of the text extracted by the different OCR tool. In some embodiments, a document metric measures a document-level OCR quality. For example, the document metric can be a total number of words in the set of text extracted by the OCR tool from the document. In some embodiments, a document metric measures a page-level OCR quality. For example, the document metric can be a number of words in the set of text extracted from the document divided by a number of pages in the document.

In some embodiments, the document metrics determined for the different text in operation 360 are fewer than the document metrics determined for each set of text in operation 330, depending on which metrics are used in comparison in further operations of method 300. For example, if operations 370 and 375 only use the number of words per page for the different text, then the number of words in the different text does not need to be calculated as a separate metric.

In 370, text extractor 116 selects a final text between the text and the different text based on the document metrics. In some embodiments, operation 370 selects between the text selected in operation 340 and the different text based on the same document metric(s) used in operation 340. In some embodiments, operation 370 selects between the text selected in operation 340 and the different text based on different document metric(s) used in operation 340. In some embodiments, operation 370 uses the same document metrics from operation 370 and other document metrics to select the final text.

In some embodiments, the final text selected is the set of text with the document metric that indicates the highest level of quality in the extracted text. For example, the document metric is the number of words in the extracted text. When the number of words in a selected text is higher than the number of words in the different text, in some embodiments, this indicates that the selected text has a higher quality than the different text, at least for the specific document.

In some embodiments, text extractor 116 selects the final text based on only some of the document metrics. For example, if the document metrics are the number of words in a text and the number of words per page for a text, the number of words per page is used by text extractor 116 to select the final text, while the number of words in the text is not used.

In 375, if the document metrics of the final text are greater than thresholds, method 300 proceeds to operation 380. If the document metrics of the final text are not greater than the thresholds, method 300 proceeds to operation 390. In some embodiments, this ensures that the final text extracted from the document is of good quality by verifying that the document metrics are greater than the threshold. For example, when the different text has a low number of words, but still has more words than the selected text from operation 340, it is still selected as the final text. However, if the number is below some threshold, this may indicate that none of the OCR tools were able to extract the text from the document in a meaningful way. The low number of words can also indicate that the document does not contain many words, such as in documents consisting primarily of images. In either case, checking the document metrics against the threshold ensures that the text extracted from the document either is of an expected quality and is sent to operation 380, or is suspect and needs to be manually checked at operation 390.

In some embodiments, operation 375 compares the same document metrics used to select the text in operation 370. In some embodiments, a different document metric is used to check against the threshold. For example, after selecting the final text based on the number of words in the selected text and the different text, the number of words per page in the final text can be compared to the threshold. In some embodiments, using the number of words per page is a better measure of how well OCR tools 114 extracted the final text from the document.

In 380, text extractor 116 saves the final text in a searchable format. In some embodiments, the text is saved in text storage 118. In some embodiments, the text is saved in PDF format. In some embodiments, the text is saved in a single document that places the selected text over the corresponding portions of the document in a machine-readable or searchable format. In some embodiments, the text is saved as a machine-readable or searchable file format separate from the original document. For example, the selected text can be stored as a JSON file.

In 390, text extractor 116 flags the document for manual review. In some embodiments, the document is sent to a computer system, such as computer system 400, or to other document storage. In some embodiments, the extracted sets of text or the selected text are sent with the document. In some embodiments, after manual review, if the selected text or one of the sets of text is determined to be an accurate representation of the document, the document and the selected text are processed according to operation 380. In some embodiments, operation 390 discards the document.

In some embodiments, error correction is performed by error corrector 120 on one or more of the sets of text extracted from the document. In some embodiments, error correction is performed as part of extracting the sets of text during operation 220, 320, or 350 or as part of saving the selected text to text storage 118 in operation 260 or 380. In some embodiments, performing error correction only on the selected text during operation 260 or 380 allows the document OCR system 110 to run faster by reducing the number of sets of text upon which error correction is performed.

In some embodiments, error corrector 120 corrects errors using spell-checking software or techniques known in the art to correct grammatical and spelling errors. In some embodiments, error corrector 120 corrects errors based on expected errors 122. In some embodiments, expected errors 122 is a set of rules for correcting errors that are expected based on known features of or issues with OCR tools 114 or expected content of the document being processed by document OCR system 110.

For example, some OCR tools 114 have difficulty identifying certain types of characters and a rule in the set of rules can identify the resulting text of such errors, such as through regular expressions, and provide a replacement or correction for the error. As another example, some documents contain specific contents, such as document citations, which spell-checking software or techniques may not be able to correct, as errors are based in the structure of the citation, rather than grammar or spelling. In such an example, the rule from the set of rules can be identifying a string of characters that is similar to a citation and correcting the citation based on the expected format of the citation. In some embodiments, the set of rules allows error corrector 120 to correct errors that typical spell-checking would not, improving the quality of the text extracted from the document.

In some embodiments, error corrector 120 identifies a group of characters in the selected text comprising an erroneous character. The rule in expected errors 122 defines the erroneous character based on the group of characters and an expected character that should be part of the group of characters. Error corrector 120 corrects the selected text by changing the erroneous character to the expected character. For example, if the group of characters is part of a citation is expected to be "U.S.C.", but the U is replaced with a V or the S is replaced with a 5 or a $, error corrector 120 identifies the group of text, such as by using a regular expression or comparison metric to identify that the group of characters is close to the expected part of the citation. Error corrector 120 then corrects the error by replacing the character with the proper one based on the rule.

In some embodiments, error corrector 120 identifies a group of characters that is missing a space between two of the characters. The rule in expected errors 122 defines that, based on the group of characters, a space should be present. Error corrector 120 corrects the selected text by adding the space between the two characters. For example, if the group of characters is part of a citation and is expected to be "35 U.S.C." but is instead "35 U.S.C.," error corrector 120 identifies the group of text, such as by using a regular expression or comparison metric to identify that the group of characters is close to the expected part of the citation. Error corrector 120 then corrects the error by adding the missing space.

In some embodiments, error corrector 120 identifies a superscript or subscript character in a group of characters. In some embodiments, the superscript or subscript character is identified based on an expected group of characters, such as part of a citation. For example, in some cases, OCR tools 114 erroneously insert such characters due to errors in extracting the text. As another example, some citations are tagged with superscript footnotes, which can interfere with properly machine reading the citation. The rule in expected errors 122 can be that superscripts or subscripts should not be present in citations. Error corrector 120 corrects the selected text by removing the superscript or subscript character. For example, if the group of characters is part of a citation and is expected to be "U.S.C." but is instead "U.S.C.$^{1}$," error corrector 120 identifies the superscript character in the group of text, such as by using a regular expression or comparison metric to identify that the group of characters is close to the expected part of the citation. Error corrector 120 determines that the superscript character is unexpected and deletes or removes the superscript character from the group of characters.

In some embodiments, error corrector 120 corrects text in the document based on expected text. For example, some documents often cite to specific statutes or regulations, such as documents describing commercial regulations citing to "15 U.S.C." Error corrector 120 identifies the expected text, such as the citation, and, when minor errors are found, corrects them to the expected text. For example, if the document describes commercial regulations and citations to "15 U.S.C." are expected, but error corrector 120 identifies a citation with the text "1S U.S.C.," then error corrector changes the "S" in "1S" to a 5 based on the expected citation. As another example, although error corrector 120 expects "15 U.S.C." as a citation, not all citations are necessarily to that statute. Another identified citation in the extracted text is "35 U.S.C." and error corrector 120 does not correct the citation because "3" is not a character that "1" is commonly mistaken for by the OCR tool.

Figure 4:
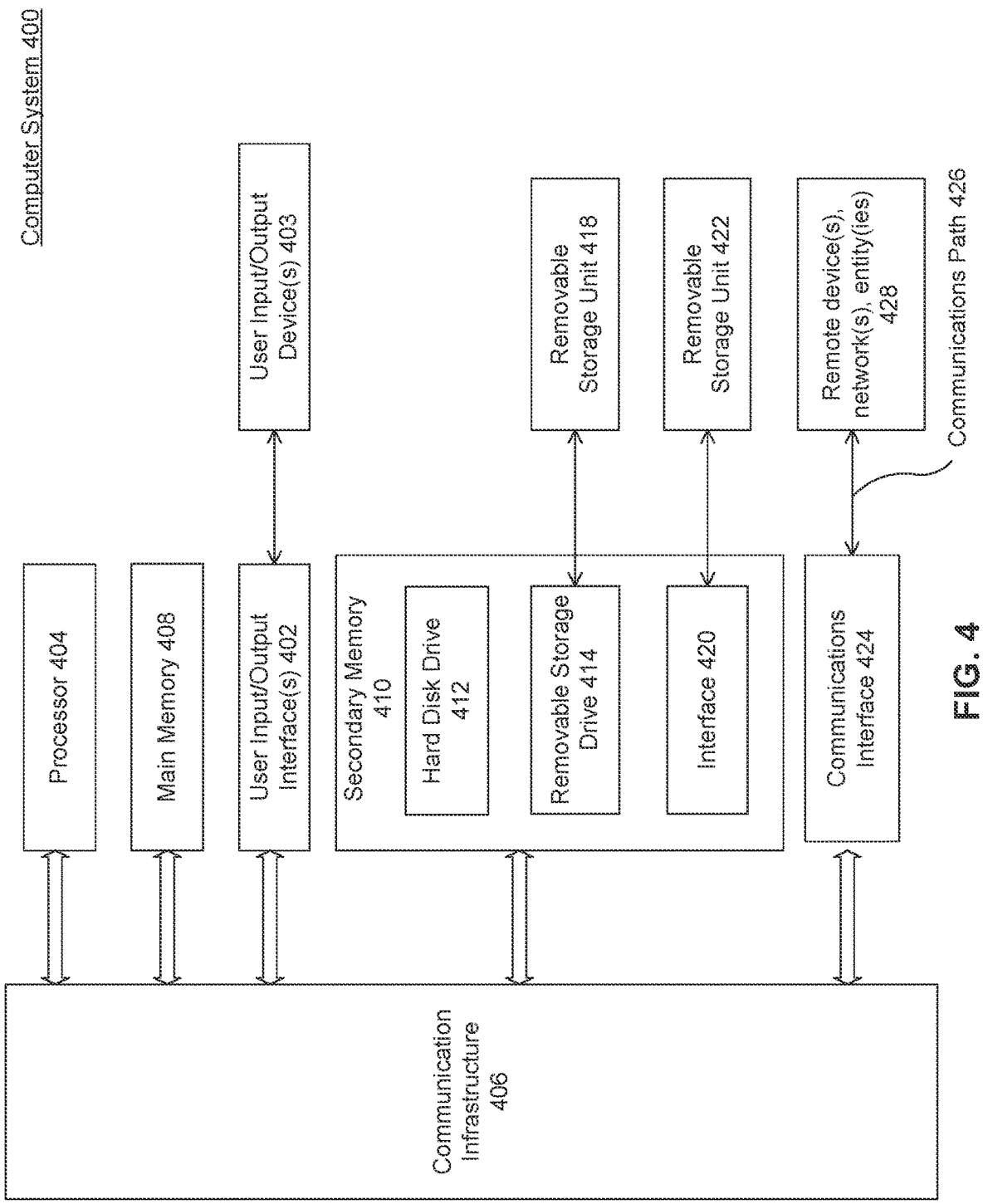
FIG. 4 depicts an example computer system useful for implementing various embodiments.

FIG. 4 depicts an example computer system 400 useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JSON, Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method, comprising:

extracting, by at least one processor, a first set of text from a document using a first optical character recognition (OCR) tool;

extracting, by the at least one processor, a second set of text from the document using a second OCR tool;

comparing, by the at least one processor, a first metric of the first set of text to a second metric of the second set of text, the first metric measuring a first level of OCR quality of the first set of text and the second metric measuring a second level of OCR quality of the second set of text;

selecting, by the at least one processor, a first selected text from the first set of text or the second set of text based on a higher level of OCR quality;

extracting, by the at least one processor, a third set of text from the document using a third OCR tool;

comparing, by the at least one processor, a corresponding metric of the first selected text to a third metric of the third set of text, the third metric measuring a third level of OCR quality of the third set of text;

determining, for the first set of text, the second set of text, and the third set of text, a fourth metric, wherein the fourth metric comprises measuring a fourth level of OCR quality based on a respective number of words in respective ones of the first set, second set, or third set of extracted texts from the document divided by a number of pages in the document;

selecting, by the at least one processor, a second selected text from the first selected text or the third set of text based on a higher level of the third level of OCR quality or the fourth level of OCR quality; and storing, by the at least one processor, the second selected text as a final text in a searchable format.

2. The method of claim 1, wherein the extracting any of the first set of text, the second set of text, or the third set of text from the document comprises:

converting, by the at least one processor, the document into a set of images, each page of the document being converted into a respective image from the set of images; and extracting, by the at least one processor, any of the first set of text, the second set of text, or the third set of text from at least one of the respective images from the set of images.

3. The method of claim 1, further comprising:

identifying, by the at least one processor, a group of characters in a selected portion of any of the first set of text, the second set of text, or the third set of text comprising an erroneous character, wherein the erroneous character is expected to be a different character based on the group of characters; and correcting, by the at least one processor, the selected portion of text by changing the erroneous character to the different character.

4. The method of claim 1, further comprising:

identifying, by the at least one processor, two or more characters in a selected portion of any of the first set of text, the second set of text, or the third set of text that is missing a space between two characters in the two or more characters; and correcting, by the at least one processor, the selected portion of text by adding the space between the two characters in the two or more characters.

5. The method of claim 1, further comprising:

identifying, by the at least one processor, a superscript character or a subscript character in a group of characters in a selected portion of any of the first set of text, the second set of text, or the third set of text that is unexpected based on the group of characters; and correcting, by the at least one processor, the selected portion of text by deleting the superscript character or the subscript character from the group of characters.

6. The method of claim 1, wherein the first metric, the second metric and the third metric comprise a respective number of words in the first set of text, the second set of text and the third set of text extracted from the document.

7. A system, comprising:

one or more processors;

memory communicatively coupled to the one or more processors, the memory storing instructions which, when executed by the one or more processors, cause the one or more processors to:

extract a first set of text from a document using a first optical character recognition (OCR) tool;

extract a second set of text from the document using a second OCR tool;

compare a first metric of the first set of text to a second metric of the second set of text, the first metric measuring a first level of OCR quality of the first set of text and the second metric measuring a second level of OCR quality of the second set of text;

select, based on the comparing, a first selected text from the first set of text or the second set of text based on a higher level of OCR quality;

extract a third set of text from the document using a third OCR tool;

compare a corresponding metric of the first selected text to a third metric of the third set of text, the third metric measuring a third level of OCR quality of the third set of text;

determine, for the first set of text, the second set of text, and the third set of text, a fourth metric, wherein the fourth metric comprises measuring a fourth level of OCR quality based on a respective number of words in respective ones of the first set, second set, or third set of extracted texts from the document divided by a number of pages in the document;

select a second selected text from the first selected text or the third set of text based on a higher level of the third level of OCR quality or the fourth level of OCR quality; and store the second selected text as a final text in a searchable format.

8. The system of claim 7, wherein the instructions further cause the one or more processors to:

extract any of the first set of text, the second set of text, or the third set of text from the document by:

converting the document into a set of images, each page of the document being converted into a respective image from the set of images; and extracting any of the first set of text, the second set of text, or the third set of text from at least one of the respective images from the set of images.

9. The system of claim 7, wherein the instructions further cause the one or more processors to:

identify a group of characters in a selected portion of any of the first set of text, the second set of text, or the third set of text comprising an erroneous character, wherein the erroneous character is expected to be a different character based on the group of characters;

correct, by the one or more processors, the selected portion of text by changing the erroneous character to the different character.

10. The system of claim 7, wherein the instructions further cause the one or more processors to:

identify two or more characters in a selected portion of any of the first set of text, the second set of text, or the third set of text that is missing a space between two characters in the two or more characters based on the two or more characters; and correct the selected portion of text by adding the space between the two characters in the two or more characters.

11. The system of claim 7, wherein the instructions further cause the one or more processors to:

identify a superscript character or a subscript character in a group of characters in a selected portion of any of the first set of text, the second set of text, or the third set of text that is unexpected based on the group of characters; and correct the selected portion of text by deleting the superscript character or the subscript character from the group of characters.

12. The system of claim 7, wherein the first metric, the second metric and the third metric comprise a respective number of words in the first set of text, the second set of text and the third set of text extracted from the document.

13. A non-transitory computer readable storage medium having computer readable code thereon, the non-transitory computer readable storage medium including instructions configured to cause a computer system to perform operations, comprising:

extracting a first set of text from a document using a first optical character recognition (OCR) tool;

extracting a second set of text from the document using a second OCR tool;

comparing a first metric of the first set of text to a second metric of the second set of text, the first metric measuring a first level of OCR quality of the first set of text and the second metric measuring a second level of OCR quality of the second set of text;

selecting, based on the comparing, a first selected text from the first set of text or the second set of text based on a higher level of OCR quality;

extracting a third set of text from the document using a third OCR tool;

comparing a corresponding metric of the first selected text to a third metric of the third set of text, the third metric measuring a third level of OCR quality of the third set of text;

determining, for the first set of text, the second set of text, and the third set of text, a fourth metric, wherein the fourth metric comprises measuring a fourth level of OCR quality based on a respective number of words in respective ones of the first set, second set, or third set of extracted texts from the document divided by a number of pages in the document;

selecting a second selected text from the first selected text or the third set of text based on a higher level of the third level of OCR quality or the fourth level of OCR quality; and storing the second selected text as a final text in a searchable format.

14. The non-transitory computer readable storage medium of claim 13, wherein the operations further comprise:

identifying a group of characters in a selected portion of any of the first set of text, the second set of text, or the third set of text comprising an erroneous character, wherein the erroneous character is expected to be a different character based on the group of characters; and correcting the selected portion of text by changing the erroneous character to the different character.

15. The non-transitory computer readable storage medium of claim 13, wherein the operations further comprise:

identifying two or more characters in a selected portion of any of the first set of text, the second set of text, or the third set of text that is missing a space between two characters in the two or more characters based on the two or more characters; and correcting the selected portion of text by adding the space between the two characters in the two or more characters.

16. The non-transitory computer readable storage medium of claim 13, wherein the operations further comprise:

identifying a superscript character or a subscript character in a group of characters in a selected portion of any of the first set of text, the second set of text, or the third set of text that is unexpected based on the group of characters; and correcting the selected portion of text by deleting the superscript character or the subscript character from the group of characters.

17. The non-transitory computer readable storage medium of claim 13, wherein the first metric, the second metric and the third metric comprise a respective number of words in the first set of text, the second set of text and the third set of text extracted from the document.

* * * * *